United States Patent
Fong et al.

(10) Patent No.: US 9,311,252 B2
(45) Date of Patent: Apr. 12, 2016

(54) HIERARCHICAL STORAGE FOR LSM-BASED NOSQL STORES

(71) Applicant: GLOBALFOUNDRIES INC., Grand Cayman, KY (US)

(72) Inventors: Liana L. Fong, Irvington, NY (US); Wei Tan, Elmsford, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 194 days.

(21) Appl. No.: 13/975,512

(22) Filed: Aug. 26, 2013

(65) Prior Publication Data

US 2015/0058548 A1    Feb. 26, 2015

(51) Int. Cl.
| | | |
|---|---|---|
| G06F 12/00 | (2006.01) | |
| G06F 12/12 | (2006.01) | |
| G06F 12/08 | (2006.01) | |
| G06F 3/06 | (2006.01) | |

(52) U.S. Cl.
CPC ............... *G06F 12/128* (2013.01); *G06F 3/06* (2013.01); *G06F 12/08* (2013.01); *G06F 12/0811* (2013.01); *G06F 12/12* (2013.01)

(58) Field of Classification Search
None
See application file for complete search history.

(56) References Cited

U.S. PATENT DOCUMENTS

| | | | |
|---|---|---|---|
| 8,312,471 B2 | 11/2012 | Davis | |
| 8,321,630 B1 | 11/2012 | Vaid et al. | |
| 8,407,190 B2 | 3/2013 | Prahlad et al. | |
| 2007/0143366 A1 | 6/2007 | D'Souza et al. | |
| 2012/0072656 A1* | 3/2012 | Archak et al. | ................ 711/104 |
| 2012/0271813 A1 | 10/2012 | Shen et al. | |
| 2012/0290779 A1 | 11/2012 | Eleftheriou et al. | |
| 2012/0317337 A1 | 12/2012 | Johar et al. | |
| 2013/0067138 A1 | 3/2013 | Schuette et al. | |

OTHER PUBLICATIONS

Fang et al., "High Performance Database Logging using Storage Class Memory," Data Engineering (ICDE), 2011 IEEE 27th International Conference, Apr. 11-16, 2011, pp. 1222-1231.
Haas et al., "Subsystem and System-level Implications of PCM," E*PCOS2011, Sep. 15, 2011, pp. 1-8.
Sockut et al. "A Survey of Online Reorganization in IBM Products and Research ." Data Engineering Bulletin 19.2, Jun. 1996 vol. 19 No. 2, pp. 4-11.

* cited by examiner

*Primary Examiner* — Baboucarr Faal
(74) *Attorney, Agent, or Firm* — Scully, Scott, Murphy & Presser, P.C.

(57) ABSTRACT

Logically arranged hierarchy or tiered storage may comprise a layer of storage being a faster access storage (e.g. solid state drive (SSD)) and another (e.g., next) layer being a traditional disk (e.g. HDD). In one embodiment, compaction occurs within the higher layer, e.g., until there is no more room and then during the compaction sequence the data may be moved down to the lower layer. In another embodiment, compaction and migration to a lower layer may occur within the higher layer, e.g., based on one or more policies, even if the higher layer is not full. In one embodiment, the data between layers are maintained as disjoint. In one embodiment, the more recent versions are always in the higher layer and the older versions are always in the lower layer.

11 Claims, 3 Drawing Sheets

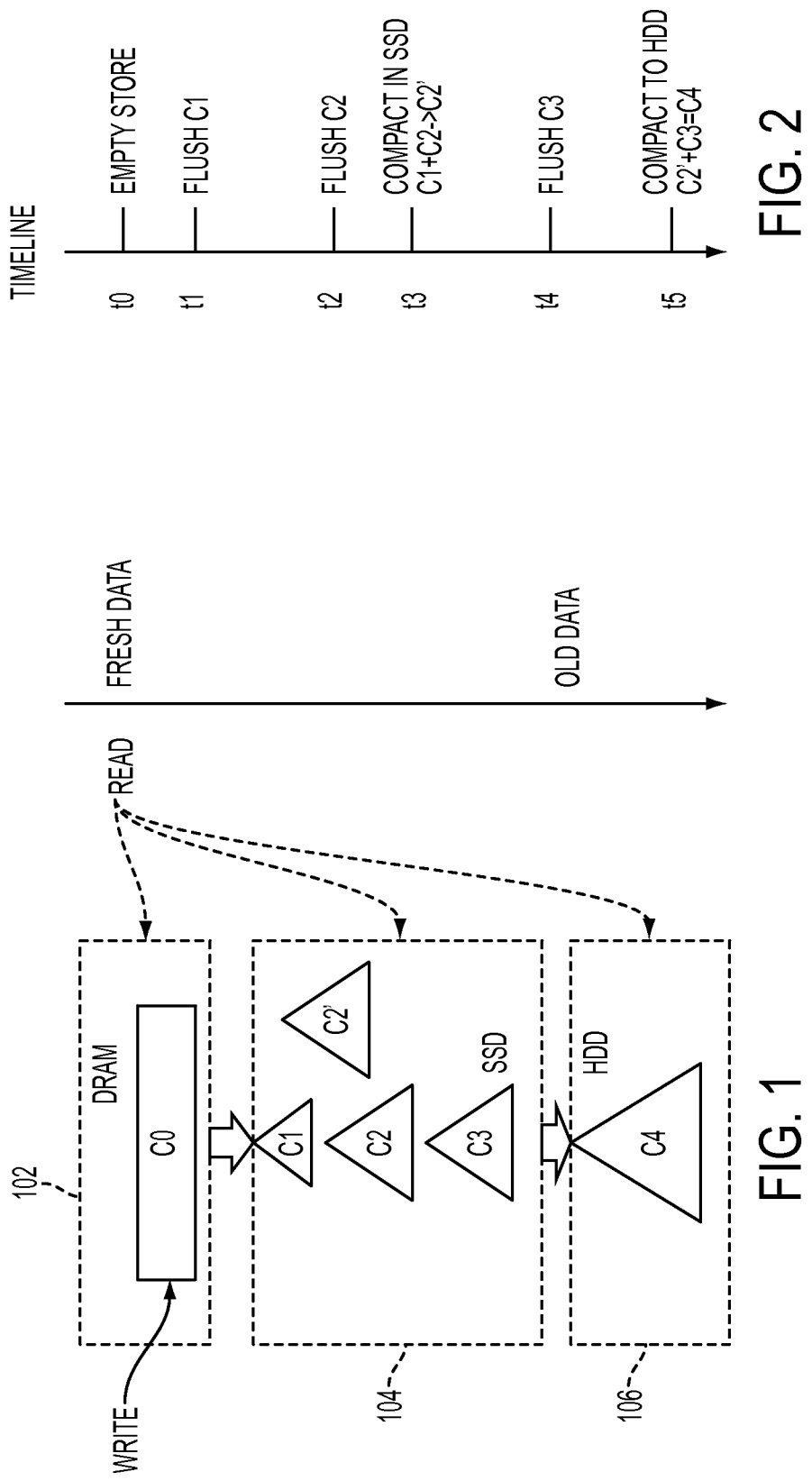

HIERARCHICAL STORAGE FOR LSM-BASED NOSQL STORES

FIELD

The present application relates generally to computers, and computer applications, data storage management, and more particularly to hierarchical storage for log-structured merge-tree (LSM) data.

BACKGROUND

To address challenges in flexible data schema and elasticity, new distributed data stores dealing with columns, key/value pairs, documents and graphs, collectively identified as NoSQL data stores, have emerged. A category of NoSQL stores are based on LSM (Log Structured Merge) tree. It is optimized for write, but does not necessarily have an optimized technique for point queries. LSM stores traditionally put data first in dynamic random-access memory (DRAM) and then move data to hard disk drive (HDD) storage hierarchy when allocated DRAM reaches maximum capacity. Read access is comparatively slow when data is in HDD. While existing systems may remedy the slow response rate by using read cache buffers in DRAM, caching mechanisms come with their own set of complexities that contribute to the data storage systems.

BRIEF SUMMARY

A method for storing data, in one aspect, may comprise placing data in uppermost storage layer of a storage hierarchy, the storage hierarchy comprising a plurality of memory and storage devices with different characteristics. The storage hierarchy is logically arranged from upper to lower layers in the order of increasing access latency. The method may further comprise flushing the data from the uppermost storage layer to a next lower storage layer in the storage hierarchy. The method may also comprise determining whether the data stored in the next lower storage layer should be compacted and migrated. The method may further comprise, in response to determining that the data stored in the next lower storage layer should be compacted and migrated, merging the data with other data stored in the next lower storage layer and migrating the data to a storage layer next to the next lower storage layer. Each storage layer in the storage hierarchy stores data that is disjoint from its upper storage layer.

A system for storing data, in one aspect, may comprise a storage hierarchy comprising a plurality of memory and storage devices with different characteristics. The storage hierarchy is logically arranged from upper to lower layers in the order of increasing access latency. A computer module may be operable to execute on a processor and further operable to place data in uppermost storage layer of the storage hierarchy. The computer module may be further operable to flush the data from the uppermost storage layer to a next lower storage layer in the storage hierarchy. The computer module may be further operable to determine whether the data stored in the next lower storage layer should be compacted and migrated, and in response to determining that the data stored in the next lower storage layer should be compacted and migrated, the computer module may be further operable to merge the data with other data stored in the next lower storage layer and migrate the data to a storage layer next to the next lower storage layer. Each storage layer in the storage hierarchy stores data that is disjoint from its upper storage layer.

A computer readable storage medium and/or device storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 1 is a block diagram illustrating a storage hierarchy of the present disclosure in one embodiment.

FIG. 2 shows an example timeline describing example operations performed on the storage hierarchy of the present disclosure in one embodiment.

DETAILED DESCRIPTION

Figure 3:
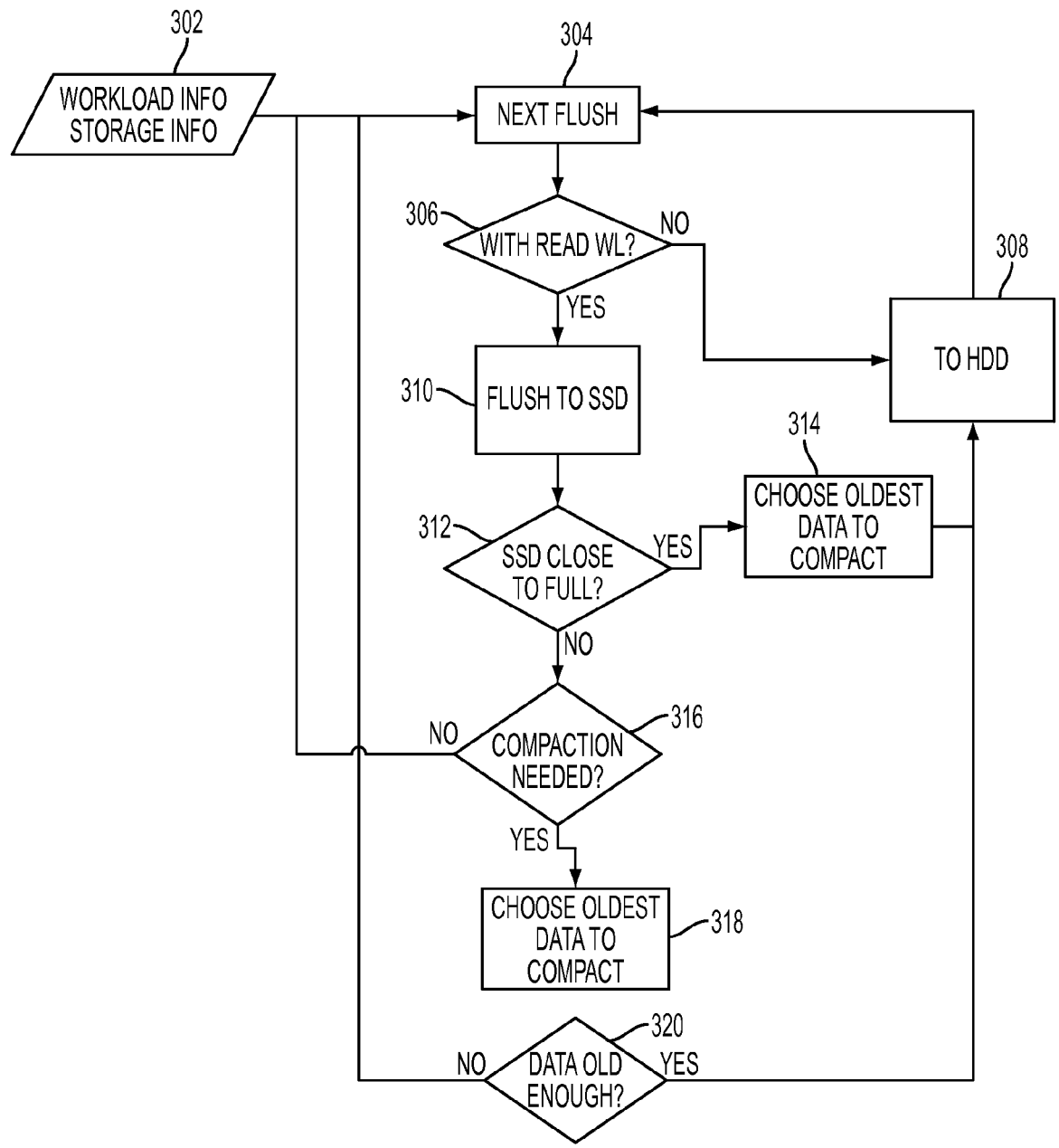
FIG. 3 is a flow diagram illustrating a method for hierarchical storage in one embodiment of the present disclosure.

A multi-tier flush and compaction methodology providing, e.g., a hierarchy of storage devices, for LSM stores are presented. The term "flush" refers to data movement from a higher to lower tier of storage. The term "compaction" refers to sorting and merging data of different versions to fewer or to a single version, in the same layer. The LSM-tree is a data structure composed of multiple data components, e.g., some data component stored in memory and some other data component stored on disk. The component on disk may comprise multiple versions of data that are periodically compacted. Storage devices in the hierarchy may comprise both volatile and non-volatile memory. In one embodiment of the present disclosure, hierarchical or tiered storage comprise a layer of storage with comparatively fast access (e.g. solid state drive (SSD)) and another (e.g., next) layer being a traditional disk (e.g. HDD) of comparatively slower access. In one embodiment, compaction occurs within the higher layer at certain event or condition (e.g., storage layer reach its maximum capacity) and then as the consequence of compaction the data may migrate down to the lower layer storage. In another embodiment, compaction and migration to a lower layer may occur within the higher layer, e.g., based on one or more policies (e.g., usage capacity reaches some thresholds), even if the higher layer is not full. In one embodiment, the data between layers are maintained as disjoint (e.g., no redundant or duplicate data), although versions of the data are maintained. In one embodiment, the more recent versions are always in the higher layer and the older versions are always in the lower layer.

FIG. 1 is a block diagram illustrating a storage hierarchy of the present disclosure in one embodiment. A storage hierarchy of the present disclosure in one embodiment may comprise a plurality of storage technologies logically arranged in the order of access speed. The storage hierarchy in the present disclosure refers to a logical hierarchy arrangement, wherein a device in upper layer or level of the hierarchy has faster access time relative to a device in a lower layer or level of the hierarchy. The storage hierarchy of the present disclose is not limited to a particular physical arrangement of the memory or storage devices that make up the hierarchy, and does not require actual layers, a physical hierarchy, or any type of physical arrangement of the memories or storages relative to each other. The "fresh" data is stored in the storage with faster access time. "Fresh" data refer to data with more recent creation time. "Stale" data refer to data with less recent creation time. Examples of storage technologies used in the storage hierarchy of the present disclosure may include, but are not limited to, phase-change memory (PCM), SSD and HDD. PCM provides random access to byte addressable non-volatile storage technology and may provide random read/read speed of approximately 200 nanoseconds. SSD is another random access non-volatile storage technology that is block-based and has read access speed of approximately 100 microseconds and write access speed of approximately 200 microseconds. HDD provides for another random access non-volatile storage technology with read/write access speed of approximately 10's of milliseconds. In the present disclosure in one embodiment, optimized usage of hierarchical storage comprising two or more of disk storage technology may be provided for LSM data store, in addition to volatile memory, e.g., dynamic random access memory (DRAM), at the uppermost layer. DRAM's access speed may be approximately 50 nanoseconds.

An example of a storage hierarchy shown in FIG. 1 comprises DRAM 102, SSD 104 and HDD 106. An LSM may include an in-memory store provided in the DRAM 102, and several on-disk non-volatile stores, for example, SSD 104 and HDD 106. In the present disclosure in one embodiment, data from DRAM are always flushed to SSD 104. Since SSD 104 has faster access time than the next storage in the hierarchy, e.g., HDD 106, fresh data can be accessed with faster speed. Thus, for example, in one embodiment of the present disclosure, the storage hierarchy may be arranged from upper to lower layers in the order of increasing access latency.

One or more multi-tier compaction policies may be provided for the data stored in a layer of the storage hierarchy, and/or moving the data to the next layer in the storage hierarchy. The compaction policies, for example, may be volume-based (sized-based) and/or age-based. An example compaction policy may provide to perform compaction in a faster storage layer, if that storage layer is not full and data is fresh (determined by a threshold or criterion). For example, the "fresh" criterion of data may be defined, for instance, by a user or through the observation of the workload on the data store. As a specific example to illustrate how "fresh" criterion may be defined, consider that a user knows that data inserted within 5 hours contribute to 80% of the total read, and an SSD hit ratio 80% is considered to be reasonable for data read. Then the user may define "5 hour" as a threshold between "fresh" and "not fresh." In this case, for example, data created in less than five hours is considered to be "fresh."

An example policy would state: When (SSD reached a capacity threshold) AND (data is fresh), perform compaction. This policy states that, if SSD is near its capacity limit and data is still fresh, compact multiple SSD components into one, and keep it in SSD. This allows for even better read latency, since only one store, instead of many, needs to be searched for a read request. Another example of compaction policy may provide that if a faster storage layer is full or data is old or not fresh (determined by a threshold or criterion), to compact and move the data into the next layer (also referred to as level) in the storage hierarchy, HDD 106 in this case.

FIG. 2 shows a timeline describing example operations performed on the storage hierarchy, e.g., shown in FIG. 1 of the present disclosure in one embodiment. Referring to FIG. 1 and FIG. 2, at time t0, the storage disks (104 and 106) may be empty. C0, C1, C2, C3, C4 refer to examples of LSM-tree structure components or the like. A data write may occur to memory 102, e.g., write into C0 component resident in memory. For instance, fresh data are first placed in the uppermost storage layer (e.g., DRAM) 102 of a storage hierarchy. Periodically data is pushed (e.g., flushed) to a disk and subsequent reads to the flushed data need to access the disk. The whole content of the uppermost storage layer 102, or a portion of it (e.g., stale portion), may be moved to the next storage layer 104 (e.g., SSD).

Thus for example, at time t1, data from C0 is flushed to disk into C1. The data is flushed to layer 104 (e.g., SSD) that is the next layer to the memory layer 102, e.g., DRAM. At time t2 in the timeline, more data is flushed to the layer 104 (e.g., SSD) from the layer at 102, e.g., DRAM, e.g., into C2. At time t3, C1 and C2 stored in the layer at 104 (e.g., SSD) may be compacted into C2'. For instance, versions of data may be merged and consolidated in certain storage layer(s), for example, in the SSD layer at 104 shown in FIG. 1.

At time t4, another flush may occur from the layer at 102 (e.g., DRAM) to the layer at 104 (e.g., SSD) into C3. At time t5, C2' and C3 at the SSD layer 104 may be compacted and moved to the next lower layer of storage in the storage hierarchy, e.g., in the example shown, to the HDD layer 106 as C4. C2' and C3 may be written directly to HDD 106 as C4, or combined and written in SDD 104, then moved to HDD 106 as C4. For example, a process may read C2' and C3, and directly output to HDD; or the process may combine C2' and C3, write the combined C2' and C3 to SSD and move to HDD. In one embodiment of the present disclosure, a migration to a lower layer of disk may be determined according to storage characteristics and usage policy, e.g., to achieve good versioned data placement. Migrations may also occur, e.g., when the layer is close to full.

The storage hierarchy of the present disclosure may be used for storing versioned data of LSM (log structured merge) tree, e.g., to achieve desirable data input/output (I/O) rates. The storage hierarchy of the present disclosure may contain multiple layers of storage devices with different characteristics, such as latency, block I/O efficiency and cost/size ratio.

In one embodiment of the present disclosure, all data moved down to the layer below, are strictly older than all data remaining in the upper layer in any storage layer. The uppermost layer (e.g., DRAM at 102) contains data fresher than any lower layer. For instance, when an upper layer usage reaches a capacity threshold, old LSM storage files may be flushed to the next storage layer. If in a given layer, LSM disk components (files) comprise C1, C2, . . . , Cn with descending freshness (the age of the files: C1<C2, . . . <Cn), then Ci is moved to the lower layer if and only if Ci+1 (which is older) is flushed as well. In one embodiment of the present disclosure, storage files (LSM storage files) are merged based on freshness of data. For instance, if in a given layer, LSM disk components (files) comprise C1, C2, . . . , Cn with descending freshness (the age of the files: C1<C2, . . . <Cn), then only adjacent files, i.e., Ci and Ci+1, are merged and consolidated.

The foregoing criteria ensure that in age/version-based data placement, data in any upper layer are fresher, i.e., newer or with a more recent version, compared to the layers below. Fresher data are always placed in upper storage layer and therefore served faster. This type of storage mechanism, e.g., may be favorable to many Internet workloads with read-latest flavor (e.g., read email, blog, social network postings, and the like). In addition, unlike a caching approach that duplicates data into faster cache, data placed in different layers of the present disclosure are disjoint. Further, LSM in the present disclosure may generate a sequential write which is favorable for SSD or the like.

FIG. 3 is a flow diagram illustrating a method for hierarchical storage in one embodiment of the present disclosure. At 302, workload information/storage information is received. Workload may include requests for accessing a database store, e.g., from a database application. An example may be a NoSQL database query, e.g., in big data and/or real-time web applications. Storage information may include the capacity and read/write operation latency of different storage layers, for example, DRAM, SSD and HDD.

At 304, data is flushed from an uppermost layer of the storage hierarchy. A flush operation may be performed on data from volatile memory to a disk. For instance, as described above, in LSM-tree data structure, C0 component (or computer file) may reside in memory, and C1 component (or computer file) may be resident on disk. New data is inserted into memory-resident C0 component. Periodically, segments of data in C0 component may be flushed to disk, and for instance, merged with disk-resident C1 component.

At 306, it is determined whether the workload contains read access. For example, a log of past data access patterns may also provide information as to whether the data being flushed is associated with read access.

At 308, if the flush is not associated with read access, the flush is performed to HDD. If a workload is write-only, a method of the present disclosure in one embodiment may decide to bypass SSD since there might not be a need to accelerate read using SSD. After 308, the processing resumes at 304.

At 310, if the flush is associated with read access, the data is moved to a next layer of storage in the storage hierarchy, e.g., SSD.

At 312, it is determined whether the layer of storage that stores flushed data, (e.g., SSD) is close to full. Close to fullness may be determined, e.g., based on a pre-defined or configurable parameter, such as whether the disk as X percent (%) full. Capacity of SSD may be obtained from storage information in 302.

At 314, if it is determined that the layer of storage is full, a set of oldest data is compacted, and moved to a next lower storage layer in the storage hierarchy at 308, e.g., to HDD. Compaction comprises merge (or merge/sort) of data, e.g., as performed in a LSM-tree structure methodology.

At 316, if it is determined that the layer of storage (e.g., SDD layer to which the data was flushed from the uppermost layer) is not full, it is determined whether compaction should be performed in the layer. Whether compaction should take place may be based on one or more policies that are defined taking into consideration the different characteristics of the storage devices in the storage hierarchy, e.g., latency, block I/O efficiency, cost and size ratio. Compaction can combine multiple on-disk components into one, so that subsequent read requests only need to touch one component instead of many. Having to touch one component instead of many reduces latency and saves I/O access, and also reduces the occupation of the storage.

At 318, if it is determined that compaction should be performed in the layer of storage (e.g., SDD), stale data is selected.

At 320, it is determined whether the selected data is stale. The "freshness" of data can be defined by a user or system administrator. For example, referring to the workload info in 302, if a user has the knowledge that 80% of the workload accesses data which are created within 5 hours, and quality of data services for SSD hit ratio 80% is sufficient, then the user may define "5 hour" as a criterion for determining whether data is fresh or stale.

If the selected data is determined to be stale, the data is moved to the next lower storage layer in the hierarchy, e.g. to HDD at 308.

If at 316, it is determined that the compaction should not be performed, the logic may continue to 304, for the next flush to occur. Similarly, if at 318, is it determined that the data is not stale, the logic may continue to 304, for the next flush to occur.

Figure 4:
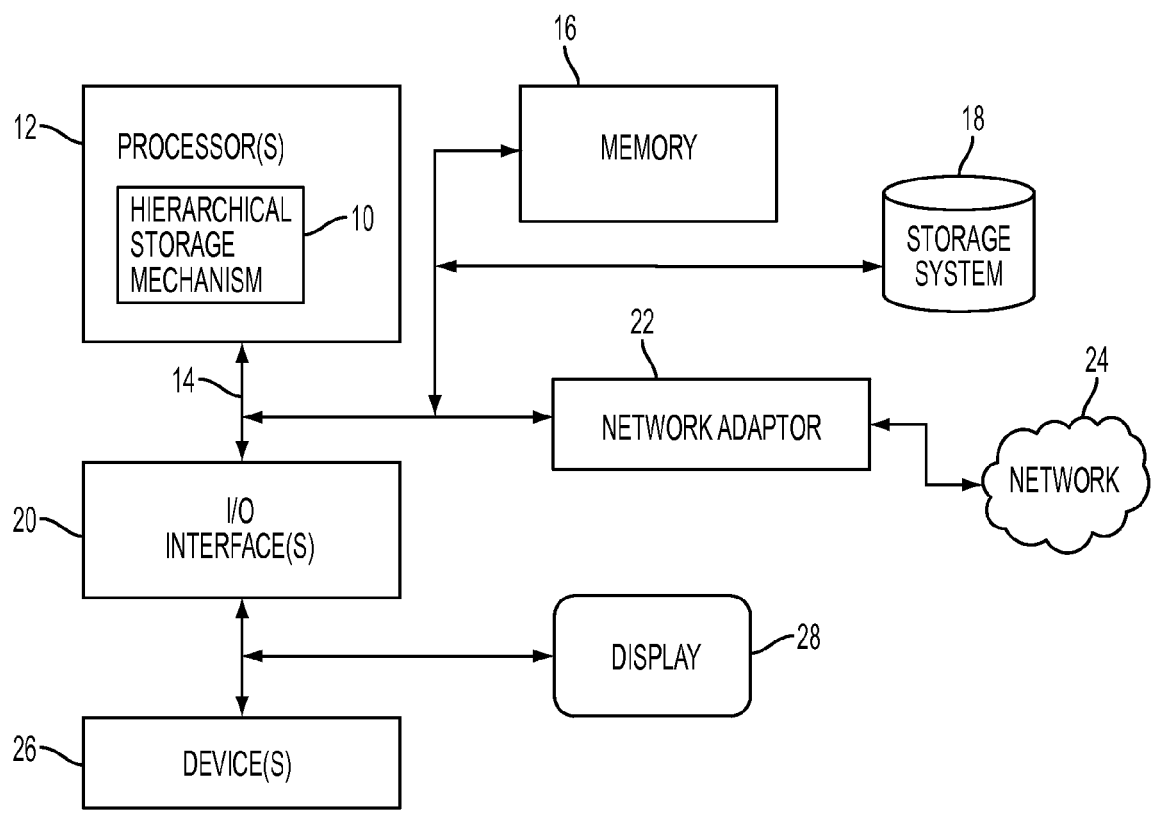
FIG. 4 illustrates a schematic of an example computer or processing system that may implement a hierarchical storage system in one embodiment of the present disclosure.

FIG. 4 illustrates a schematic of an example computer or processing system that may implement a hierarchical storage system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a hierarchical storage mechanism module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for storing data, comprising:
   placing, by at least one computer processor, data in uppermost storage layer of a storage hierarchy, the storage hierarchy comprising a plurality of memory and storage devices with different characteristics, wherein the storage hierarchy is logically arranged from upper to lower layers in order of increasing access latency;
   flushing, by the at least one computer processor, the data from the uppermost storage layer to a lower storage layer in the storage hierarchy, wherein the flushing comprises responsive to determining that the data is write-only data, bypassing a next lower storage layer and directly storing the data to a further lower storage layer in the storage hierarchy, and responsive to determining that the data is associated with read access, flushing the data from the uppermost storage layer to the next lower storage layer in the storage hierarchy;
   determining, by the at least one computer processor, whether the data stored in the next lower storage layer should be compacted and migrated; and
   in response to determining that the data stored in the next lower storage layer should be compacted and migrated, by the at least one computer processor, compacting the data and other data stored in the next lower storage layer, the compacting comprising sorting and merging data of different versions in the next lower storage layer to fewer or to a single version, and migrating the data to a storage layer next to the next lower storage layer,
   wherein each storage layer in the storage hierarchy stores data that is disjoint from its upper storage layer.

2. The method of claim 1, wherein the method is for storing versioned data of a log structured merge tree.

3. The method of claim 1, wherein the determining is performed based on one or more policies.

4. The method of claim 3, wherein the one or more policies are based on at least age of the data.

5. The method of claim 3, wherein the one or more policies are based on at least volume of the data.

6. The method of claim 1, wherein whether the data stored in the next lower storage layer should be compacted and migrated is determined based on whether the next lower storage layer is filled to a defined capacity.

7. The method of claim 1, wherein the uppermost storage layer comprises volatile memory.

8. The method of claim 1, wherein the next lower storage layer and the storage layer next to the next lower storage layer comprise non-volatile storage devices of respective different characteristics.

9. The method of claim 1, wherein the uppermost storage layer comprises DRAM, the next lower storage layer comprises SSD, and the storage layer next to the next lower storage layer comprises HDD.

10. The method of claim 1, wherein the storage hierarchy comprises three or more combinations of DRAM, PCM, SSD and HDD.

11. The method of claim 1, wherein the compacting the data further comprises combining multiple on-disk components into one on-disk component so that subsequent read requests to the multiple on-disk components touch the one on-disk component instead of the multiple on-disk components.

* * * * *